Patented Apr. 6, 1937

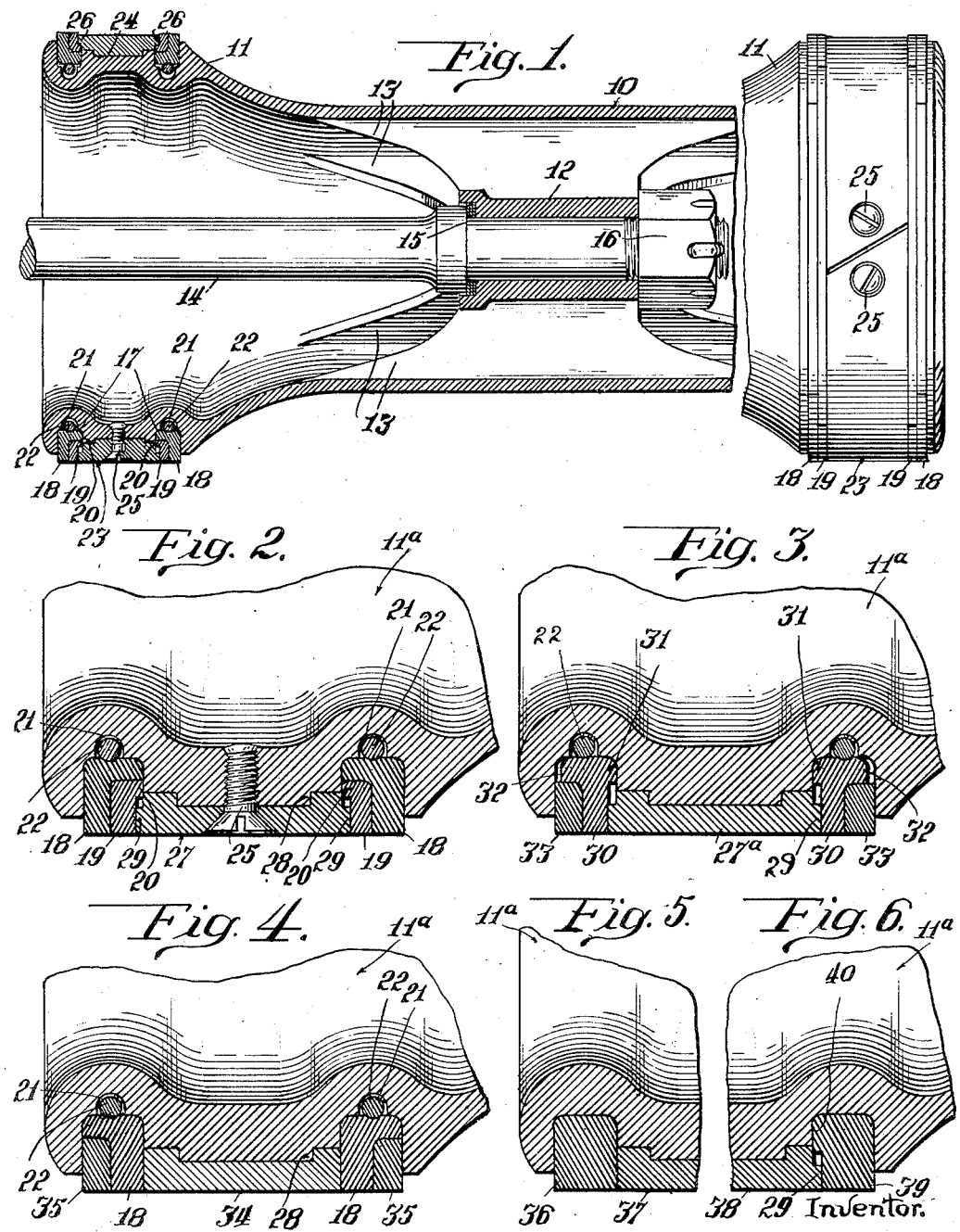

2,076,302

UNITED STATES PATENT OFFICE 2,076,302

PISTON MEMBER

Henry E. Muchnic, Atchison, Kans., assignor to The Locomotive Finished Material Company, Atchison, Kans., a corporation of Kansas Application July 25, 1935, Serial No. 33,139

4 Claims. (Cl. 309—29)

My invention relates more particularly to a member with a head especially adapted for use in the steam chests of locomotives and has for its object the provision of a comparatively light member whereby the reciprocating load on the operating mechanism will be reduced.

The invention also has for its object the provision of a member provided with a carrier or bull-ring which constitutes a part of one side wall of the packing ring receiving channels; which may be applied to the member after the packing rings are in place, and which can be very simply varied in depth or thickness to take care of oversized bushings in the steam chests.

The invention also contemplates a construction wherein the carrier or bull-ring is circumferentially applied, instead of laterally or longitudinally as heretofore, and which provides the essential self-locking feature against steam leak; and hence the necessity of having the valve proper form a steam tight joint at the sides of the bull-ring is eliminated, with the result that the structure can be more economically manufactured. At the same time the structure can be adapted to varying diameters in valve chamber bushings without changing the valve body.

A further object of the invention is the provision of a valve wherein the sectional packing rings are subjected to expanding means and also to means for restraining the ultimate expansion of the rings and which latter means, in the event any of the ring-segments become broken, also prevents such broken segments dropping into the steam ports in the bushings of the steam chests.

The above enumerated objects and advantages, as well as other advantages inherent in the construction, will all be more readily comprehended from the detailed description of the accompanying drawing, wherein:—

Figure 1 is a sectional elevation of my improved valve with an intermediate part broken away and showing packing rings of the sectional type and with the bull-ring riveted in place.

Figure 2 is a sectional view of a portion of a valve-head showing a channeled bull-ring arranged to receive an annular rib on the valve-head; the packing rings being of the sectional type shown in Figure 1 wherein the bull-ring affords means for restraining ultimate expansion.

Figure 3 is a similar view illustrating a one piece bull ring and a modification of packing rings.

Figure 4 is a similar view illustrating a composite packing ring wherein the sectional ring is held in place by a one piece ring.

Figure 5 is a view of one end of a valve-head provided with a snap ring and the section of the bull-ring shown with a straight side.

Figure 6 is a view of one end of a valve-head provided with a lipped packing ring and a two piece bull-ring provided with a shoulder arranged to overlap the path of the lip of the ring.

My invention, as exemplified in Figure 1, is especially adapted for use as a piston valve in the steam chests of a locomotive and comprises a one piece body or intermediate tubular portion 10 of predetermined length and terminating in integral heads 11, 11, which are of a predetermined width and diameter which approximates the internal diameter of the usual ported bushings at opposite ends of the steam chests.

The valve body, preferably midway between the ends, is provided with a concentrically disposed hub 12 supported by a number of integral spokes 13 formed integral therewith and with the inner perimeter of the valve body; the webs or spokes being preferably flared from their juncture with the hub 12 in a gradual manner toward the heads at opposite ends, thereby providing a very rigid structure. The hub 12 receives one end of the valve-stem or rod 14, which is shown shouldered at 15 a distance removed from its immediate end; the shoulder 15 being shown seated in an annular socket formed in one end of the hub; while the outer end of the rod is threaded to receive the nut 16 which may be locked in place in the usual manner.

The single piece valve body provides a lighter construction than when made of a number of parts as heretofore and hence less wear on the valve gear and on the valve chamber bushing will be encountered, as well as less wear on the weight supporting elements or packing members of the valve and therefore less frequent renewal of the packing; the central connection with the rod providing a better balanced construction.

The heads 11 of the valve are provided with a pair of parallelly arranged and spaced apart channels 17, 17, disposed circumferentially and adapted to receive the packing elements which in the particular exemplification Figure 1 consist of the sectional rings 18 and 19 which normally extend radially beyond the outer perimeter of the head; the rings being composed of sections of predetermined length and the sections of ring 18 being preferably of L-shape in cross-section.

The sections of ring 19, at their inner perimeters, are provided with the laterally disposed lips 20. The base portions of ring sections 18 are adapted to carry the sections of ring 19; and the heads of the valve beneath the ring receiving channels are shown provided with grooves 21 which are provided with expander means or rings 22, which may be of circular cross-section as shown.

The portion of the head between the channels 17, 17 in the exemplification shown in Figure 1 is shown provided with a carrier or bull-ring 23 which spans the distance between the packing ring channels 17, 17 and on its inner perimeter is provided with an annular rib 24 which seats in an annular groove in the head of the valve and holds the bull-ring against movement longitudinally of the valve-head.

The bull-ring, especially if of a two piece type, may be secured to the valve-head by countersunk screws or rivets as 25 whose inner ends are swaged as shown; and the opposite edges at the outer perimeters are extended to provide the laterally disposed shoulders 26, which extend to the sides of the main portion of rings 19, 19 and hence overlap the circumferential planes of the lips 20 of the rings 19 and restrain the ultimate expansion of the rings and at the same time prevent displacement of a ring segment or of a broken segment.

It is apparent from the construction shown that the expander rings 22 will urge the rings 18 and 19 radially outward and such outward expanding movement will be permitted merely to a predetermined degree by the restraining shoulder 26 of the carrier or bull-ring 23. As my improved valve is especially intended for use in the steam chests of a locomotive and as these chests are generally provided with ported bushings spaced apart and at each end of the chests thus providing a gap therebetween, it is essential that the packing rings must be restrained from maximum expansion, otherwise it would be impossible to introduce the valve into the bushing located at the end of the steam chest removed from the end through which the valve is introduced.

It is also apparent from this construction that if any of the ring segments should become broken they would be restrained from dropping into the ports of the bushings; the segments of ring 18, by reason of their laterally extended bases, would be held by the segments of ring 19 and the segments of the latter would be restrained by their lips 20 coming into contact with the bull-ring shoulder 26.

In Figure 2 the construction is substantially similar to that heretofore described, except that the bull-ring 27,—which is also shown secured against radial displacement by countersunk and swaged screws or rivets 25,—on its inner periphery is channeled to receive an annular rib 28 integral with the head 11ª of which only a portion is shown.

The head 11ª is shown provided with spaced apart channels, as in Figure 1, to receive the sectional packing rings 18 and 19, which in turn are urged radially by the expander rings 22 arranged in the grooves located in the bottoms of the ring channels.

Like in the construction shown in Figure 1, the circumferential edges of the carrier or bull-ring 27 are extended at the outer periphery of the bull-ring to provide the shoulders 29 which overlap or extend into the circumferential path of the lips 20 of the ring sections 19 and prevent outward movement of the rings beyond a predetermined degree; the shoulders of the bull-rings being spaced from the lips 20 of the ring sections 19, when the latter are in non-expanded condition, allow a predetermined amount of outward radial movement of those sections of the rings which are located at the sides and top of the valve when the latter is arranged horizontally.

In Figure 3 I illustrate a modification in so far as the packing rings are concerned; the carrier or bull-ring 27ª being a one piece bull-ring which is sprung into place and hence need not be riveted in place; the bull-ring, as in the previously described constructions, forms one side wall of each ring holding channel. The packing rings in this construction consist of the ring sections 30, approximating inverted T-shape cross-section, except that the lip 31 on one side at the base of the section is shorter than the lip or leg 32 on the opposite side and which supports the ring 33.

It will be noted that the base of the ring section 30 is substantially equal to the width of the channel at the throat or entrance, namely between the edge of the bull-ring and the wall of the head, thus permitting the ring sections 30 to be inserted in the channels after the bull-ring has been put into place. The snap-ring 33 is then applied and forces the section 30 toward one side of the channel where the lip 31 will be disposed beneath the shoulder 29 of the bull-ring.

The opposite circumferential edges of the bull-ring 27, as in the previous constructions, extend into the circumferential plane of the channels of the valve-head and hence extend across the radial paths of the lips 31 of the sectional rings 30, and limit the outward movement of the ring sections; the degree of outward movement being equal to the distance between lips 31 and the shoulders 29 of the bull-ring as seen in the figures where the rings are shown in non-expanded condition, a condition which may obtain at the bottom of a horizontally disposed valve, causing the expansive effect of the expanders 22 to be effective at the sides and the top of the valve-heads.

In Figure 4 the carrier or bull-ring 34, like the bull-rings 27, is provided on its inner perimeter with an annular channel to receive the rib 28 of the valve-head 11ª; the sides, however, being made straight, namely without the shoulders, so that the entire sides are flush with the side walls of the channels in the valve-heads.

The packing rings in this exemplification consist of a sectional ring 18 of L-shape in cross-section which are held in place by a one-piece ring 35, which, in this instance, constitutes the means for restraining the expansive or radially outward movement of the sectional rings; the expansive movement being induced by the expanders 22.

Figure 5 illustrates merely one end or section of a valve-head 11ª provided with a straight sided snap ring 36 and with a carrier or bull-ring 37 whose circumferential edge is also straight like that of bull-ring 34 in Figure 4 and which may be of a single piece type circumferentially applied.

Figure 6 shows one end or section of the head of a distribution member 11ª having channels (only one being shown) with a bull-ring 38 therebetween. The circumferential edge of the bull-ring is provided with a shoulder 29 like the bull-rings shown in Figures 2 and 3.

The packing ring 39 is shown provided at its base with a laterally disposed lip 40 arranged in the channel beneath the overhanging shoulder 29 of the bull-ring which will restrain outward movement of the ring 39 after a predetermined degree of radial movement. The bull-ring 38, in this construction, is preferably of a two-piece type riveted to the head of the member as shown in Figures 1 and 2. With the ring 39 having a lip 40 as shown, the ring is first put into place and the two piece bull-ring then applied so that its shoulder 29 will extend into the path of the lip 40 of the ring.

As is apparent in all of the forms shown, the bull-rings are adapted to be applied radially or circumferentially as distinguished from the bull-rings applied laterally or in a direction longitudinally of the valve as heretofore; and furthermore, in my improved construction the bull-rings form one side wall or a greater part of a side wall of each of the packing ring receiving channels. The bull-rings which are channeled on their inner perimeters to receive the ribs on the valve-head and therefore are of less thickness throughout a major portion of the width may be of the snap ring or single piece type; while bull-rings having the ribs on the inner perimeters and hence of greater thickness are preferably composed of two or more pieces and riveted to the valve-heads as shown.

It is apparent from my improved construction having solid heads about which the bull-rings are disposed, there are no joints extending to the valve-head interior and hence there is no possibility of steam-leaks to the interior of the head, because all joints are disposed on the exterior of the valve-head.

I have shown exemplifications of my improved steam distribution member provided with channels having ring assemblages involving expansion and retention features and wherein the bull-rings are arranged intermediate of the channels in which the packing ring assemblages are located; and while I believe these to be the best embodiments it will be understood that modifications are possible and may be made without, however, departing from the spirit of my invention as expressed in the appended claims.

What I claim is:

1. A piston member comprising a single piece head portion provided with a pair of axially spaced circumferential channels and an annular recess therebetween, said channels being of greater radial depth than said annular recess; a carrier or bull-ring radially contracted into the annular recess and fixedly secured to the head against expansive movement, said bull-ring having opposed sides forming an extension of the side walls of said channels and being provided with laterally disposed annular shoulders at its outer perimeter adapted to overlap the channels at opposite sides thereof; sectional packing rings located in said channels and provided with laterally disposed lips adapted to extend beneath the annular shoulders of the carrier or bull-ring to prevent radial displacement of the sectional packing rings, the bull-ring and the packing rings normally extending into a circumferential plane beyond that of the piston head; and expander means located beneath the sectional packing rings.

2. A piston member comprising a single piece head portion provided with a pair of spaced apart circumferential channels and with an annular recess between said channels, said channels being of greater radial depth than said annular recess; sectional packing rings located in said channels and provided with lips at the base portions of the rings disposed laterally toward the recessed portion of the head; expander means beneath the sectional rings; a contractible carrier or bull-ring whose sides form extensions of the side walls of both channels and are provided with laterally disposed shoulders at the outer perimeter and adapted to be radially seated in said recess to thereby lock the packing rings in place, the bull-ring being immovably secured to the piston head; and means intermediate of the head and the inner perimeter of the carrier or bull-ring whereby an interlocked relation between the latter and the piston head is provided to prevent movement of the bull-ring longitudinally of the piston head.

3. A piston member of the character described comprising a single piece head provided with a pair of spaced apart circumferential channels and with an annular recess therebetween, said channels being of greater radial depth than said annular recess, sectional packing rings located in each channel and provided with lips at the base portions disposed toward the recessed portion of the head; expander means beneath the sectional rings; a sectional carrier or bull-ring adapted to be radially applied to said recess and fixedly secured to the head against radial movement; said bull-ring having opposed sides forming an extension of the side walls of said channels and having shoulders at the outer perimeter disposed laterally into said channels adapted to lock the packing ring sections in place; and an interengaging rib and groove relation between the head and the inner perimeter of the carrier or bull-ring whereby movement of the bull-ring in a direction lengthwise of the piston is prevented.

4. A piston member comprising a single piece head portion provided with a pair of axially spaced circumferential channels and an annular recess therebetween, said channels being of greater radial depth than said annular recess; a carrier or bull-ring radially contracted into the annular recess and fixedly secured to the head against expansive movement, said bull-ring having opposed sides forming an extension of the side walls of said channels; sectional packing rings located in said channels; the bull-ring and the packing rings normally extending into a circumferential plane beyond that of the piston-head; and expander means located beneath the sectional packing rings.

HENRY E. MUCHNIC.